March 23, 1971 W. F. WILLIAMS 3,572,135

RELATIVE POSITION LOCKOUT FOR STEP-POSITIONED SHAFT PAIR

Filed Oct. 21, 1969 2 Sheets-Sheet 1

INVENTOR.
WINSTON F. WILLIAMS

BY R. W. Anderson
AGENT

RELATIVE POSITION LOCKOUT FOR STEP-POSITIONED SHAFT PAIR

Filed Oct. 21, 1969

INVENTOR.
WINSTON F. WILLIAMS

BY R. W. Anderson
AGENT 3,572,135

RELATED POSITION LOCKOUT FOR STEP-POSITIONED SHAFT PAIR

Winston F. Williams, Cedar Rapids, Iowa, assignor to Collins Radio Company, Cedar Rapids, Iowa Filed Oct. 21, 1969, Ser. No. 867,996

Int. Cl. F16h 35/18

U.S. Cl. 74—10.54 4 Claims

ABSTRACT OF THE DISCLOSURE

This invention comprises a combination camming and locking means for a pair of shafts which are positionable to predetermined relative angular positions. A dog member mounted for rotation with one of the shafts and a sector camming member mounted for rotation with the other of the shafts cooperate in a combination camming and locking fashion to prevent the selection of particular permutations as concerns relative shaft positions.

This invention relates generally to shaft positioning devices and more particularly to a mechanical lockout means associated with a pair of rotatable shafts whereby certain relative rotational positions of the pair of shafts are rendered mechanically unattainable.

More particularly the present invention relates to a lockout device for a pair of shafts each positionable in discrete detented angular increments wherein one or more of the incrementable shaft positions associated with one shaft are unattainable when the other of the shafts is in a predetermined position or positions.

The present invention finds special usage in a remote tuning control system wherein, for example, the two shafts, each operating switches, the position permutations of which generate a tuning code for a remotely tuned radio tunable over a predetermined frequency range. The device to be tuned may be designed to tune a radio, for example, to various frequencies between 220.00 mHz. and 399.95 mHz. in 0.05 increments. Mechanical limits in the tuned device may necessitate that the code responsive remote positioning means be restricted within predefined rotational limits. The code generating means may be capable of generating code in response to which the remote system would be commanded to exceed its design limits.

A general object of the present invention is to provide a mechanical lockout device associated with first and second shafts, the respective position combination of which are instrumental in generating a tuning code for a remote device, whereby tuning code generation calling for remote tuning outside of predetermined limits is obviated.

The invention is featured in the provision of first and second cooperating mechanical elements mounted respectively on the two shafts, whereby those permutations of relative shaft angular positions which would result in a tuning selection outside the design limits of the controlled device, are mechanically locked out.

The invention is further featured in provision of a mechanical lockout means associated with a pair of positionable shafts which might be associated with a remote control tuning device for a radio, wherein relative shaft positions effecting respective remote digit tuning control are limited to a predetermined range of digits, and selections outside the range are unobtainable.

Figure 1:
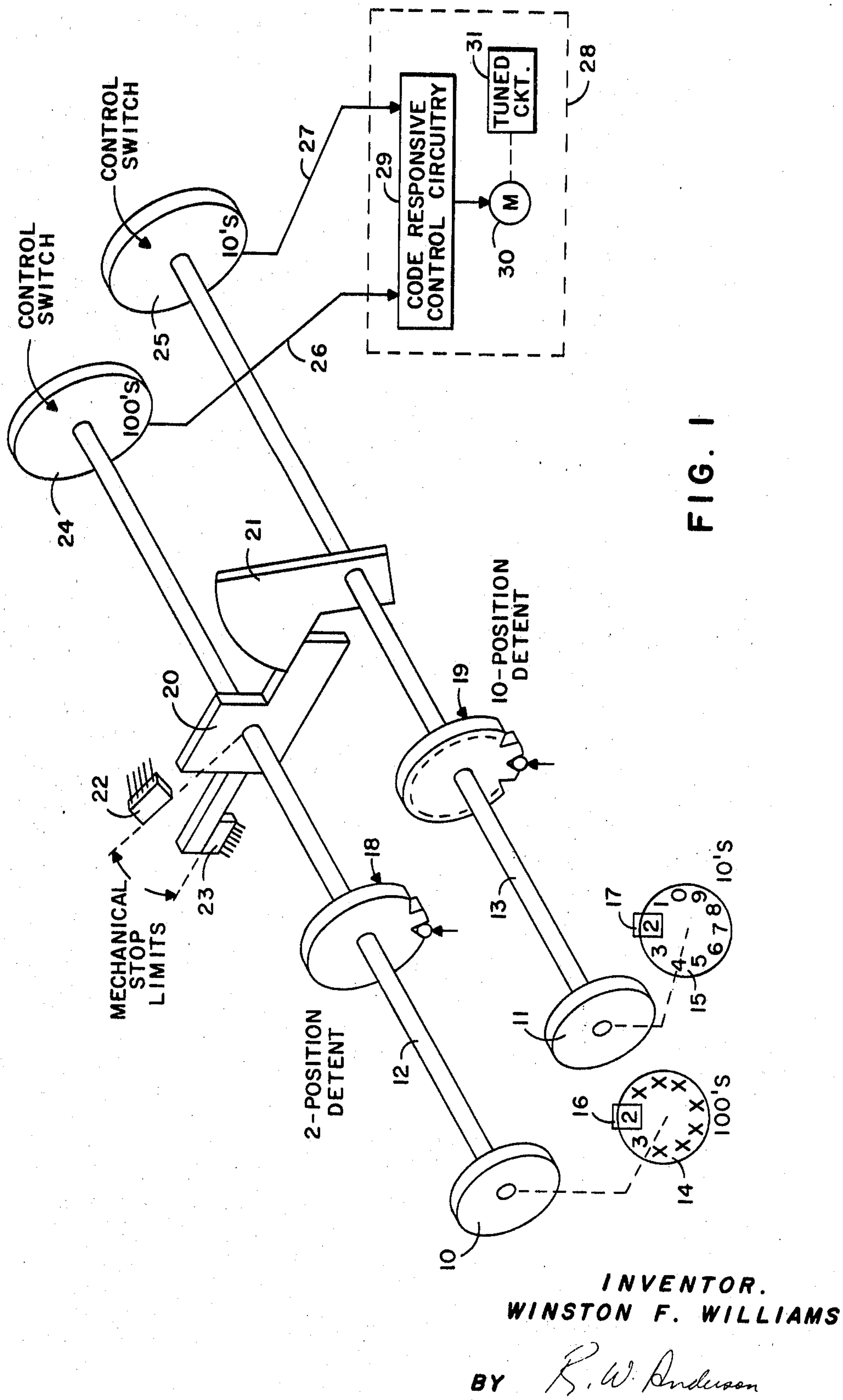

These and other objects and features of the present invention will become apparent upon reading the following description in conjunction with the accompanying drawings in which:

FIG. 1 is a functional mechanical diagram of a remote control tuning system in which first and second digit defining rotatable shafts cooperate with a mechanical lockout to prevent the selection of particular permutations as concerns relative shaft positions; and FIGS. 2 through 6 illustrate the lockout feature of the invention as obtained by the respective shaft angular positions and the cooperative arrangement of lockout members.

As mentioned above, the present invention relates to means associated with first and second positionable shafts whereby certain angular position combinations of the two shafts are unattainable. This type of limitation on the relative rotation positions between a pair of shafts might be encountered in a remote control system such as depicted functionally in FIG. 1. FIG. 1 illustrates a first and second control knob 10 and 11, the angular positions of which are indicated on associated counter wheels 14 and 15, respectively. The angular position of shaft 10 is indicated in the counter window 16 while the angular position of shaft 11 is indicated in the counter window 17. In a remote control tuning system for a radio, the viewed digits on counters 14 and 15 might correspond, for example, to the hundreds and tens digits of a frequency to which a remotely tuned device is to be tuned. This arrangement is depicted functionally in FIG. 1 by means of control switches 24 and 25 associated with the control shafts 12 and 13, respectively, each of which are interwired through connections 26 and 27 to a code responsive control circuitry 29 at the remote tuned device 28. The circuitry 29 may be electrically and mechanically associated with a motor which positions a tuned circuit 31, such as, for example, the shaft of a variable condenser. Generally speaking, the control switches, such as switches 24 and 25, generate a code in response to which the associated remote control circuitry tunes the current 31 by shaft position commands. The tuned circuit 31 is thus positioned in accordance with the particular combination setting of the control switch shafts, such as shaft 10 or 11. In systems of this type, should a code be set in the control switches, by rotation of knobs 10 and 11, which is untunable as concerns the remotely tuned device, the motor 30 at the remote position could attempt to drive the tuned device beyond its limits and cause damage. Assuming, for example, that the particular tuned device 28 is a radio which is to be tuned between 220 and 390 mHz., the following relative shaft positions of the control knobs 10 and 11 would be usable combinations.

| Hundreds digits: | Tens digits |
|---|---|
| 2 | 2 through 9 |
| 3 | 0 through 9 |

The radio is not tunable below 2–2 or in excess of 3–9 as concerns the hundreds and tens digits defining the tuned frequency.

The permutations of hundreds and ten digits are seen, therefore, to exclude the combination 2–1 and the combination 2–0. Note, however, that all permutations of the hundreds digit three and the tens digit 0–9 must be effected, implying that the tens digit defining control shaft must be positionable to all possible positions with the hundreds digits shaft in position "3." It is further seen that, with the hundreds digit shaft in position "2," the tens digit shaft cannot be positioned to digits 1 and 0. With these defined limitations as concerns relative shaft positions, it is seen that with the hundreds digit in the "2" position the tens digit shaft cannot be positionable to positions "1" or "0," the hundreds shaft is positionable to either "2" or "3" and the tens shaft cannot be rotated from position "9" to position "0" when the hundreds shaft is in position "2."

While it is realized that a remote tuning control system might permit relative shaft positions corresponding to tuning commands outside of the tuning range in a mechanical sense and incorporate electrical lockout means to prevent response to commands outside the tuning range, the present invention provides a simple mechanical means to accomplish the lockout.

In accordance with the present invention the desired lockout is accomplished by means of a dog member 20 rigidly affixed transverse to and rotatable with the hundreds digit shaft 12, and a cam member 21 (actually a combination cam and locking dog member 21) similarly associated with the tens digit shaft 13. The shaft 12 is shown associated with a two-position detent member 18 corresponding to adjacent detented shaft positions at one-tenth revolution increments of shaft 12, or 36°. The tens digit shaft 13 is associated with a ten-position detent member 19 defining ten equal detented positions at 36° intervals. As illustrated in FIG. 1, the relative positions of the dogs 20 and the cam 21 correspond to digit "2" positions of both of the shafts 12 and 13. In the system under example here this would correspond to 220 mHz. or the lower range of the remotely tuned device 28.

Dog member 20 is seen to be formed with an extension which cooperates with respective mechanical stop members 22 and 23, such that shaft 12 is limited to rotation between the first and second detented positions at 36° intervals. Although the mechanical stops are shown as being operative in conjunction with an extension of dog member 20, it is to be realized that any known mechanical stop means might be incorporated with shaft 12 to limit its rotation between predefined first and second angular positions.

The manner in which the relative angular positions of shafts 12 and 13, as set by control knobs 10 and 11, respectively, are limited to the sequential relative positions of 2–2 through 3–9 as above outlined, is illustrated in FIGS. 2 through 6.

Figures 2, 3, 4, 5, 6:
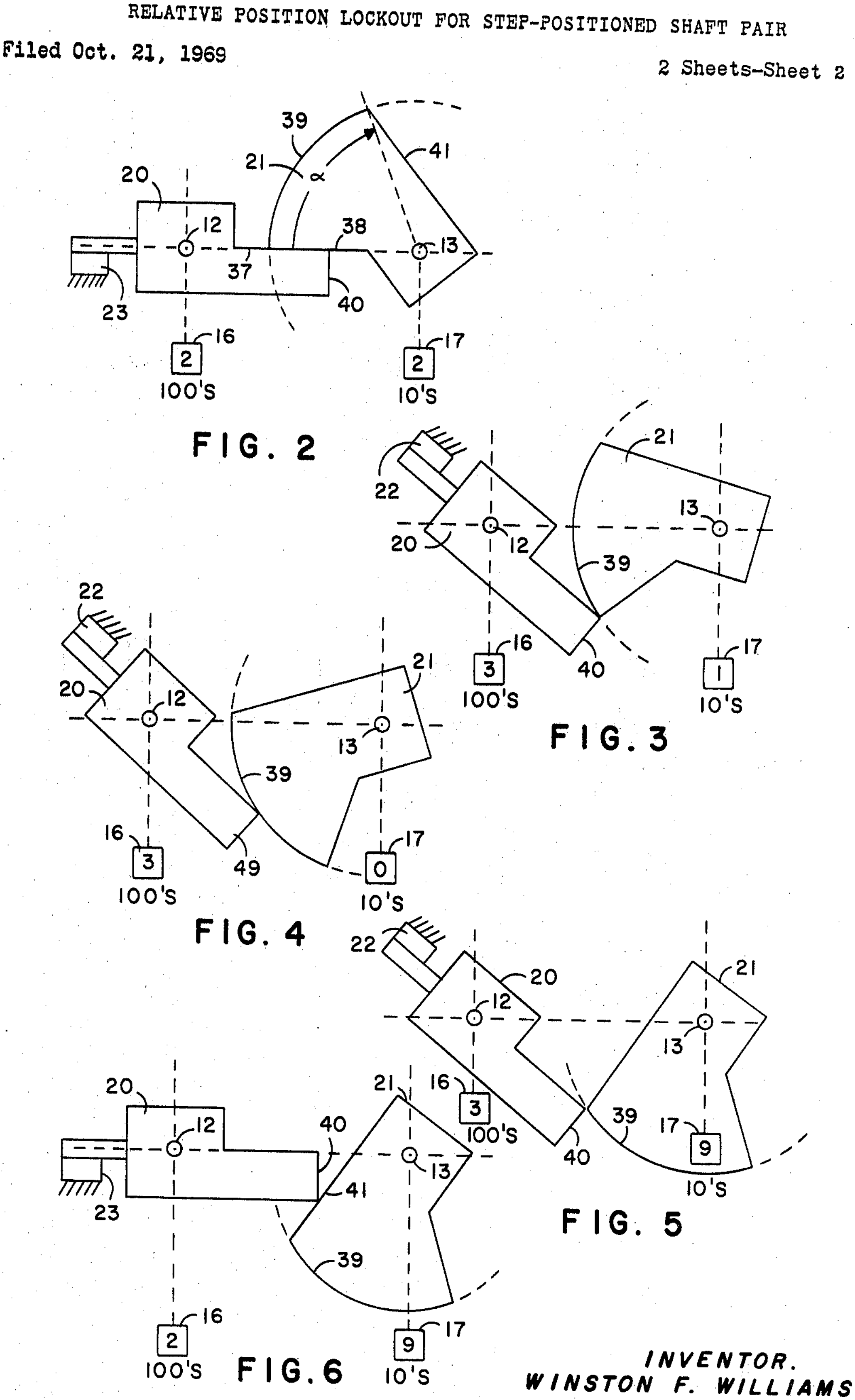

With reference to FIG. 2 the dog 20 as affixed to shaft 12 is seen to comprise an extension having an edge 37 lying substantially along the axis between shafts 12 and 13 and includes an end face 40. The sector cam member 21 is rotatable with shaft 13 and comprises a sector face 39 defining an angle $\alpha$ between a radial drawn from shaft 13 to the sector terminus and radially extending edge 38. In the relative positions illustrated in FIG. 2 the face 37 of dog member 20 is juxtaposed with the radial edge 38 of the sector cam 21. Note also that counterclockwise rotation of dog 20 is prevented by means of the stop limit 23 and that the relative positions of shafts 12 and 13 depicted in FIG. 2 corresponds to the "2" position each of the shafts 12 and 13.

A detent mechanism is associated with each of the shafts 12 and 13. Shaft 12 is provided with a two-position detent (see FIG. 1) such that each of its two possible positions are detented. Shaft 13 is provided with a ten-position detent 19 by means of which the ten incremental angular positions of shaft 13 are positively defined.

All possible positions of the tens shaft 13 must be permitted when the hundreds shaft 12 is in the digit "3" position. No combination of relative shaft positions representing a tuned frequency below 220 can be possible. FIG. 3 illustrates the cam and dog cooperation which prevents the operator from tuning from 220 to, for example, 210. As the operator rotates shaft 13 counterclockwise to set in the digit "one" on the shaft 13, the radial edge 38 of sector cam 39 cams against the radially extending edge 37 of dog 20 and rotates shaft 12 one detented position clockwise as illustrated in FIG. 3. At this point the edge 37 of dog 20 may be made to slightly clear the sector edge 39 of cam 21 by judicious choice of cam mountings bearing in mind that shaft 12 is detented. Thus, as the edge 38 of sector cam 21 forces dog 20 to rotate clockwise into its next detented position, the dog 12 may exhibit a slight further travel into the positive detent. Thus with reference to FIG. 3, should the operator attempt to rotate the tens shaft 13 from the digit "two" position to the digit "one" position when the shaft 12 is in the digit "two" positions, the resulting code set up by the shaft pair corresponds to 310 rather than 210. The combination establishing 310 lies within the established tuning range of the exampled system. Note that the shaft positions in FIG. 3 defining the relative positions of the dog 20 and sector cam 21 provide a positive mechanical lock against further counterclockwise rotation of shaft 12 back to the digit "two" position since the edge 37 of dog 20 butts against the sector portion 39 of cam 21.

With reference to FIG. 4 wherein the relative shaft positions established the code for 300 mHz., it is likewise impossible to rotate shaft 12 clockwise to its digit "two" position, due to continued mechanical interference between the edge 37 of dog 20 and the sector portion 39 of cam 21. Thus, the setting of a code for 200 mHz. is not possible.

FIG. 5 represents a rotation of the tens shaft 13 one further counterclockwise position to the digit "nine" position. With the relative shaft positions illustrated in FIG. 5, when shaft 12 is in the digit "3" position, the shaft 13 is free to be rotated through all ten possible positions, and thus all digit combinations between 3–0 and 3–9 are possible.

Now referring to FIG. 6, should shaft 12 be in the digit "two" position when the shaft 13 is in the digit 9 position, further clockwise rotation of shaft 13 to a digit "zero" position is prevented due to a positive mechanical lock between the radially extreme edge of dog 20 and the edge 41 of the sector cam 21. FIG. 6 illustrates that it is not possible for the operator to go from a setting of 290 to a setting of 200, the latter falling below the tuning range of the exampled remote tuned device.

The camming and locking relationships illustrated in FIGS. 2 through 6 thus illustrate that it is not possible by rotation of either one of the shafts individually, or the shaft pair in combination, to arrive at a pair of shaft positions which can establish a code beneath the 220 limit or in excess of the 390 limit.

With reference to FIG. 2 should the operator attempt to tune below 220 by counterclockwise rotation of the tens digit shaft 13, the inefficient and high friction camming arrangement between the faces 38 and 37 of the respective locking members 20 and 21 exhibits a considerable retarding force to his intended setting. Only upon the exertion of a noticeably increased counterclockwise torque can the operator cam the dog 20 to the digit "3" position as illustrated in FIG. 3. Thus the arrangement of FIG. 2 in essence defines an overridable mechanical stop at the low end of the tuning range. Should this stop be overridden as seen in FIG. 3, the tuning permutation merely jumps to 310 which falls within the tuning range.

The present invention thus provides a simple mechanical expedient for discretely blocking out a predetermined portion of a step tuning code as established by a pair of shafts. In general the angle $\alpha$ (FIG. 2) which defines the sector portion 39 of the cam 21 is chosen to be equal in degrees to the number of detented positions to be blocked out. In the example given here positions "zero" and "one" on the tens shaft 13 are blocked out when the hundreds shaft 12 is in the digit "2" position. Thus in the example given the angle $\alpha$ is chosen to be twice times the angular increment defining the detented positions of shaft 13 ($\alpha=2\times36°=72°$). If further blockouts are desirable, the angle $\alpha$ may be increased 36° for each additional blockout. Correspondingly should but one blockout be desired on the tens shaft, the angle $\alpha$ would be reduced to approximately 36° as measured from the radially extending edge 38 of cam 21.

The particular dog and cam shapes depicted in FIGS. 2 through 6 are by way of specific example and are not to be interpreted as in a limiting sense. FIG. 2 illustrates the radius of the sector cam defining the angle $\alpha$ as being equal to the radius of the dog between the shaft 12 and the edge 40 thereof. With this arrangement the rotation of shaft 13 one detented position counterclockwise, as depicted in FIG. 3, causes the shaft 12 to rotate clockwise by the same number of degrees. This expedient would thus be employed in an arrangement wherein the detented positions of the shafts 12 and 13 are defined by the same angular increments. In the general sense the rotation of shaft 13 clockwise by one detented position as depicted in FIG. 3 would be instrumental in rotating shaft 12 into its next detented clockwise position; thus the radii of the dog and sector, as well as the spacing between the shafts 13, must be considered in the particular design. With reference to FIG. 6 the thickness of dog 20, as defined by the edge 40, shall be such, in conjunction with the stop edge 41 of the sector cam 21, as to establish a positive mecahnical locking relationship (contact) as depicted in FIG. 6.

I claim:

1. A mechanical lockout means for predetermined relative angular positions of first and second shafts, said first shaft being positionable to first and second mechanically limited angular positions, said second shaft being positionable to a plurality of *m* equally spaced positions with angular position increments defined as 360/m. degrees. comprising a dog member extending from and rotatable with said first shaft, a sector cam member extending from and rotatable with said second shaft, each of said dog and cam members including an edge portion extending radially from its associated shaft, said radially extending edge portions being of defined lengths to establish a predetermined juxtaposition of said radially extending edges when said shafts are in a first predetermined relative position, said sector cam member including an arcuate face extending from said radially extending edge thereof an angle $\alpha$ equal to an integral number of said angular position increments of said second shaft, a second side of said cam member extending from the terminus of said arcuate face, the radially extreme end of said dog member having a predetermined thickness such that a juxtaposition between said dog and said second side of said cam member is realized with said dog in a first position and said cam in a predetermined one of the angular positions associated therewith, whereby said second shaft is rotatable through all possible positions when said first shaft is in a first position and said first shaft is blocked from being positioned from said first to said second position thereof when said second shaft is positioned to any one of a predetermined number of adjacent ones of its predetermined angular positions, the number of said predetermined adjacent positions being determined by the angle defined by the arcuate face of said cam member.

2. Lockout means as defined in claim 1 wherein the distance between the rotational axes of said first and second shafts define a predetermined juxtaposition of the radially extending edges of said dog and cam members with said shaft in the first predetermined relative position such that rotational force imparted from the radially extending edge of said cam member to the radially extending edge of said dog member cams said dog member from the first to the second position thereof.

3. Lockout means as defined in claim 2 wherein the detented angular positions of said first and second shafts are offset by an amount sufficient that the camming action between said camming member and said dog urges said dog into the detent controlling position of the second position of said dog, the detent action being sufficient to impart a further rotational increment of said dog to assure clearance between the radially extreme edge of said dog and the arcuate surface of said cam member.

4. A lockout means as defined in claim 1 wherein the first and second positions of said first shaft are defined by integers *n* and $n+1$, respectively, the respective positions of said second shaft are defined by successive integers 0 through 9, said first predetermined relative position of said first and second shafts being defined by a first shaft position corresponding to the integer *n* and a second shaft corresponding to the integer *m*, the arcuate face of said cam member corresponding to a plurality of *m* angular shaft increments of said second shaft, whereby shaft positions of said second shaft corresponding to integers successively less than the integer *m* and including the integer zero are obtainable when said first shaft is in a position corresponding to the integer *n*, and said second shaft is not positionable from the position defined by the integer 9 to the position definable by the integer 0 when said first shaft is in the position defined by the integer $n+1$.

References Cited

UNITED STATES PATENTS

| | | | |
|---|---|---|---|
| 2,856,780 | 10/1958 | Hemphill et al. | 74—10.54X |
| 2,942,482 | 6/1960 | Liggett et al. | 74—10.2 |
| 3,434,356 | 3/1969 | Weiss | 74—10.2 |

MILTON KAUFMAN, Primary Examiner

U.S. Cl. X.R.

74—10.2